(12) United States Patent
Zhang et al.

(10) Patent No.: US 11,783,599 B2
(45) Date of Patent: Oct. 10, 2023

(54) DISTRACTED-DRIVING MONITORING METHOD, SYSTEM AND ELECTRONIC DEVICE

(71) Applicant: ArcSoft Corporation Limited, Zhejiang (CN)

(72) Inventors: Xiaodi Zhang, Zhejiang (CN); Zhiwei Zhang, Zhejiang (CN); Tianlong Bao, Zhejiang (CN); Chunhui Ding, Zhejiang (CN); Jin Wang, Zhejiang (CN)

(73) Assignee: ARCSOFT CORPORATION LIMITED, Zhejiang (CN)

( * ) Notice: Subject to any disclaimer, the term of this patent is extended or adjusted under 35 U.S.C. 154(b) by 36 days.

(21) Appl. No.: 16/626,350

(22) PCT Filed: Dec. 3, 2019

(86) PCT No.: PCT/CN2019/122790
§ 371 (c)(1),
(2) Date: Oct. 19, 2021

(87) PCT Pub. No.: WO2020/181840
PCT Pub. Date: Sep. 17, 2020

(65) Prior Publication Data
US 2022/0180648 A1 Jun. 9, 2022

(30) Foreign Application Priority Data
Mar. 8, 2019 (CN) .......................... 201910175982.0

(51) Int. Cl.
G06V 20/59 (2022.01)
G06V 20/64 (2022.01)
(Continued)

(52) U.S. Cl.
CPC .......... *G06V 20/597* (2022.01); *B60W 40/08* (2013.01); *B60W 50/16* (2013.01); *G06V 20/64* (2022.01);
(Continued)

(58) Field of Classification Search
CPC .... G06V 20/597; G06V 20/64; G06V 40/161; G06V 2201/07; B60W 40/08;
(Continued)

(56) References Cited

U.S. PATENT DOCUMENTS 10,882,398 B2 * 1/2021 Cordell ................. G06V 20/597
10,915,769 B2 * 2/2021 Meng ..................... G06V 40/50
(Continued)

FOREIGN PATENT DOCUMENTS

CN 104239847 A 12/2014
CN 104598934 A 5/2015
(Continued)

OTHER PUBLICATIONS

International Search Report for PCT application PCT/CN2019/122790.
(Continued)

*Primary Examiner* — Mohamed Barakat
(74) *Attorney, Agent, or Firm* — Gang Yu

(57) ABSTRACT

A distracted-driving monitoring method, system and an electronic device are provided. The distracted-driving monitoring method includes: acquiring an image of a driver; detecting a target object in the image to obtain a detection result; obtaining a determination result of a driving behavior according to the detection result; and sending an alarm signal when the determination result indicates that a distracted-driving behavior occurs. Through at least some embodiments of the present disclosure, the distracted-driving behavior of the driver can be monitored in real time and
(Continued)

alarmed, thus urging the driver to concentrate in driving, to ensure safe driving and avoid traffic accidents. In addition, the specific type of the distracted-driving behavior can also be determined and different alarm signals can be given, which can be used as a basis for law enforcement or for data collection, data analysis, and further manual confirmation; thereby solving the problem of traffic accidents caused by not monitoring the distracted-driving behavior of the driver during driving.

15 Claims, 3 Drawing Sheets

(51) Int. Cl.
*G06V 40/16* (2022.01)
*B60W 40/08* (2012.01)
*B60W 50/16* (2020.01)
*B60W 50/14* (2020.01)

(52) U.S. Cl.
CPC ..... *G06V 40/161* (2022.01); *B60W 2050/143* (2013.01); *B60W 2050/146* (2013.01); *B60W 2420/42* (2013.01); *B60W 2540/229* (2020.02); *G06T 2207/30201* (2013.01); *G06T 2207/30268* (2013.01); *G06V 2201/07* (2022.01)

(58) Field of Classification Search
CPC ........... B60W 50/16; B60W 2050/143; B60W 2050/146; B60W 2420/42; B60W 2540/229; G06T 2207/30201; G06T 2207/30268
See application file for complete search history.

(56) References Cited

U.S. PATENT DOCUMENTS

| | | |
|---|---|---|
| 2014/0368628 A1 | 12/2014 | Tsou et al. |
| 2015/0001979 A1 | 1/2015 | Deguchi et al. |
| 2018/0238686 A1 | 8/2018 | Blacutt et al. |
| 2019/0065873 A1* | 2/2019 | Wang ............... G06V 20/46 |
| 2019/0377933 A1* | 12/2019 | Hara ............... G06V 40/171 |

FOREIGN PATENT DOCUMENTS

| | | | | |
|---|---|---|---|---|
| CN | 106529565 A | | 3/2017 | |
| CN | 106709420 A | | 5/2017 | |
| CN | 108609018 A | | 10/2018 | |
| CN | 108629282 A | * | 10/2018 | ......... G06K 9/00281 |
| CN | 108629282 A | | 10/2018 | |
| CN | 109063574 A | | 12/2018 | |
| CN | 109063574 A | * | 12/2018 | ......... G06K 9/00664 |
| CN | 110399767 A | | 11/2019 | |
| JP | 2008165326 A | * | 7/2008 | ......... G06K 9/00791 |
| JP | 2008165326 A | | 7/2008 | |
| JP | 2009087204 A | | 4/2009 | |
| JP | 2018509668 A | | 4/2018 | |
| JP | 2019036008 A | | 3/2019 | |
| KR | 20140065520 A | | 5/2014 | |
| KR | 20190016332 A | | 2/2019 | |

OTHER PUBLICATIONS

CN search report re: Application No. 201910175982.0.
EP search report dated Oct. 19, 2020 re: Application No. 19817571. 3, pp. 1-10.
Anonymous: "Statistical classification—Wikipedia", May 28, 2018 (May 28, 2018),x XP055724678, Retrieved from the Internet: URL: https://en.Wikipedia.org/w/index.php?title=Statistical_classification &oldid=843354472. p. 2, line 17-line 24.

* cited by examiner

DISTRACTED-DRIVING MONITORING METHOD, SYSTEM AND ELECTRONIC DEVICE

TECHNICAL FIELD

The present disclosure relate to the field of computer vision processing technology, and in particular to a distracted-driving monitoring method, system and an electronic device.

BACKGROUND

With the development of the national economy, the number of domestic car ownership continuous to rise, household vehicles and transportation vehicles are increasing rapidly. At the same time, the number of traffic accidents has risen rapidly, causing numerous casualties and major property losses. How to reduce the number of traffic accidents is a common concern of the whole society. In the driving process, behaviors such as answering or making a call, smoking, drinking or eating may distract the driver from driving, which is one of the most common causes of traffic accidents. Therefore, it is necessary to monitor the behavior of the driver while driving, and when a distracted behavior such as answering or making a call, smoking, drinking or eating occurs, the driver can be promptly warned, and a monitor result can be feedback to the regulatory agency, to reduce the risk of traffic accidents.

SUMMARY

At least some embodiments of the present disclosure provide a distracted-driving monitoring method, system and an electronic device, so as at least to partially solve a technical problem of traffic accidents caused by not monitoring the distracted-driving behavior of the driver during driving.

In an embodiment of the present disclosure, a distracted-driving monitoring method is provided, which includes: acquiring an image of a driver; detecting a target object in the image to obtain a detection result, and the target object corresponds to a distracted-driving behavior; obtaining a determination result of a driving behavior according to the detection result; and sending an alarm signal when the determination result indicates that the distracted-driving behavior occurs.

In an optional embodiment, the image is acquired by an image acquisition component, and the image acquisition component is an independent camera apparatus or a camera apparatus integrated in an electronic device.

In an optional embodiment, the target object includes at least one of the following: a cigarette, a mobile phone, a drink bottle, a food, and the distracted-driving behavior corresponding to the target object includes at least one of the following: smoking, answering or making a call, drinking, eating.

In an optional embodiment, the detection result indicates whether or not the target object is contained in the image, and when the detection result indicates that the target object is contained in the image, the determination result of the driving behavior indicates the distracted-driving behavior occurs.

In an optional embodiment, the detection result includes a type of the target object and a probability value corresponding to the type of the target object.

In an optional embodiment, the method further includes: filtering the detection value according to the probability value.

In an optional embodiment, the method further includes: comparing the probability value of the detection result corresponding to the type of the target object with a first threshold value to obtain a comparison result; and filtering the detection result according to the comparison result.

In an optional embodiment, the method further includes: when the comparison result indicates the probability value corresponding to the type of the target object is larger than the first threshold value, retaining the detection result; when the comparison result indicates the probability value corresponding to the type of the target object is not larger than the first threshold value, discarding the detection result.

In an optional embodiment, when there are multiple probability values of the detection results are greater than the first threshold value, a detection result with the highest probability value is retained.

In an optional embodiment, the method further includes: detecting a face area after the image is acquired.

In an optional embodiment, the detection result includes a position of the target object.

In an optional embodiment, the method further includes: evaluating a rationality of the detection result by analysing a relative positional relationship between the position of the target object and a predetermined reasonable area.

In an optional embodiment, evaluating the rationality of the detection result by analysing the relative positional relationship between the position of the target object and the predetermined reasonable area includes: calculating a cross ratio of the positon of the target object and the predetermined reasonable area corresponding to the target object, and comparing the cross ratio with a second threshold value; when the cross ratio is larger than the second threshold value, determining that the position of the target object is in the predetermined reasonable area, and the target detection result is credible; when the cross ratio is not larger than the second threshold value, discarding the target detection result.

In an optional embodiment, after the image is acquired, the method further includes: pre-processing the image to obtain a pre-processed image, and the pre-processing includes at least one of the following: image scaling, pixel value normalization, image enhancement.

In an optional embodiment, a position, a type and a probability value of the target object in the image or the pre-processed image are determined by using a depth learning algorithm, and the probability value is a probability of which type the target object belongs to.

In an optional embodiment, a final determination result is determined by combining determination results of continuous frames.

In an optional embodiment, a queue structure is used for storing the determination result of each frame in the last t seconds, the queue structure is maintained to obtain a queue record, the queue record is traversed, and when a proportion of a driving behavior in the last t seconds exceeds a third threshold value, this driving behavior is taken as the final determination result.

In another embodiment of the present disclosure, a distracted-driving monitoring system is provided, which includes: an image acquisition component, configured to acquire an image of a driver; a detection component, configured to detect a target object in the image to obtain a detection result; a logical determination component, configured to obtain a determination result of a driving behavior according to the detection result; and a communication component, configured to send an alarm signal when the determination result indicates a distracted-driving behavior occurs.

In an optional embodiment, the image acquisition component is an independent camera apparatus or a camera apparatus integrated in an electronic device.

In an optional embodiment, the target object includes at least one of the following: a cigarette, a mobile phone, a drink bottle, a food, and the distracted-driving behavior corresponding to the target object includes at least one of the following: smoking, answering or making a call, drinking, eating.

In an optional embodiment, the detection result includes at least one of the following: whether there is a target object, a position of the target object, a type of the target object, and a probability value corresponding to the type of the target object.

In an optional embodiment, the logical determination component is further configured to filter the detection result according to the probability value.

In an optional embodiment, the logical determination component is further configured to compare the probability value of the detection result corresponding to the type of the target object with a first threshold value to obtain a comparison result, filter the detection result according to the comparison result, when the comparison result indicates the probability value of the detection result corresponding to the type of the target object is larger than the first threshold value, retain the detection result, and when the comparison result indicates the probability value corresponding to the type of the target object is not larger than the first threshold value, discard the detection result.

In an optional embodiment, when there are multiple probability values of detection results greater than the first threshold value, a detection result with the highest probability value is retained.

In an optional embodiment, the detection component is further configured to detect a face area after the image is acquired.

In an optional embodiment, the logical determination component is further configured to evaluate a rationality of the detection result by analysing a relative positional relationship between the position of the target object and a predetermined reasonable area.

In an optional embodiment, evaluating the rationality of the detection result by analysing the relative positional relationship between the position of the target object and a predetermined reasonable area includes: calculating a cross ratio of the positon of the target object and the predetermined reasonable area corresponding to the target object, and comparing the cross ratio with a second threshold value; when the cross ratio is larger than the second threshold value, determining that the position of the target object is in the predetermined reasonable area, and the target detection result is credible; when the cross ratio is not larger than the second threshold value, discarding the target detection result.

In an optional embodiment, the detection component is further configured to obtain a position, a type and a probability value of the target object in the image by using a depth learning algorithm, and the probability value is a probability of which the target object belongs to.

In an optional embodiment, the logical determination component is further configured to determine the final determination result by combining determination results of continuous frames.

In an optional embodiment, the logical determination component is further configured to store the determination result of each frame in the last t seconds by using a queue structure, maintain the queue structure to obtain a queue record, traverse the queue record, and when a proportion of a driving behavior in the last t seconds exceeds a third threshold value, take this driving behavior as a final determination result.

In another embodiment of the present disclosure, an electronic device is provided, which includes: a processor; and a memory for storing executable instructions of the processor; and the processor is configured to perform any distracted-driving monitoring methods as described above by executing the executable instructions.

In another embodiment of the present disclosure, a storage medium is provided, which includes: a stored program, and a device in which the storage medium is stored is controlled to execute any distracted-driving monitoring methods as claimed as described above when the stored program is running.

In the at least some embodiments of the present disclosure, by executing the following steps, that is, acquiring the image of the driver; detecting the target object in the image to obtain a detection result; obtaining a determination result of a driving behavior according to the detection result; and sending an alarm signal when the determination result indicates that a distracted-driving behavior occurs. The distracted-driving behavior of the driver can be monitored in real time and alarmed, thus urging the driver to concentrate in driving, to ensure safe driving and avoid traffic accidents. In addition, the specific type of the distracted-driving behavior can also be determined and different alarm signals can be given, which can be used as a basis for law enforcement or for data collection, data analysis, and further manual confirmation; thereby solving the problem of traffic accidents caused by not monitoring the distracted-driving behavior of the driver during driving.

BRIEF DESCRIPTION OF THE DRAWINGS

The accompanying drawings are used for providing further understanding of the present disclosure, and are part of the description. The exemplary embodiments and description are used for explaining the present disclosure rather than limit the present disclosure. In the accompanying drawings.

DETAILED DESCRIPTION

Figure 1:
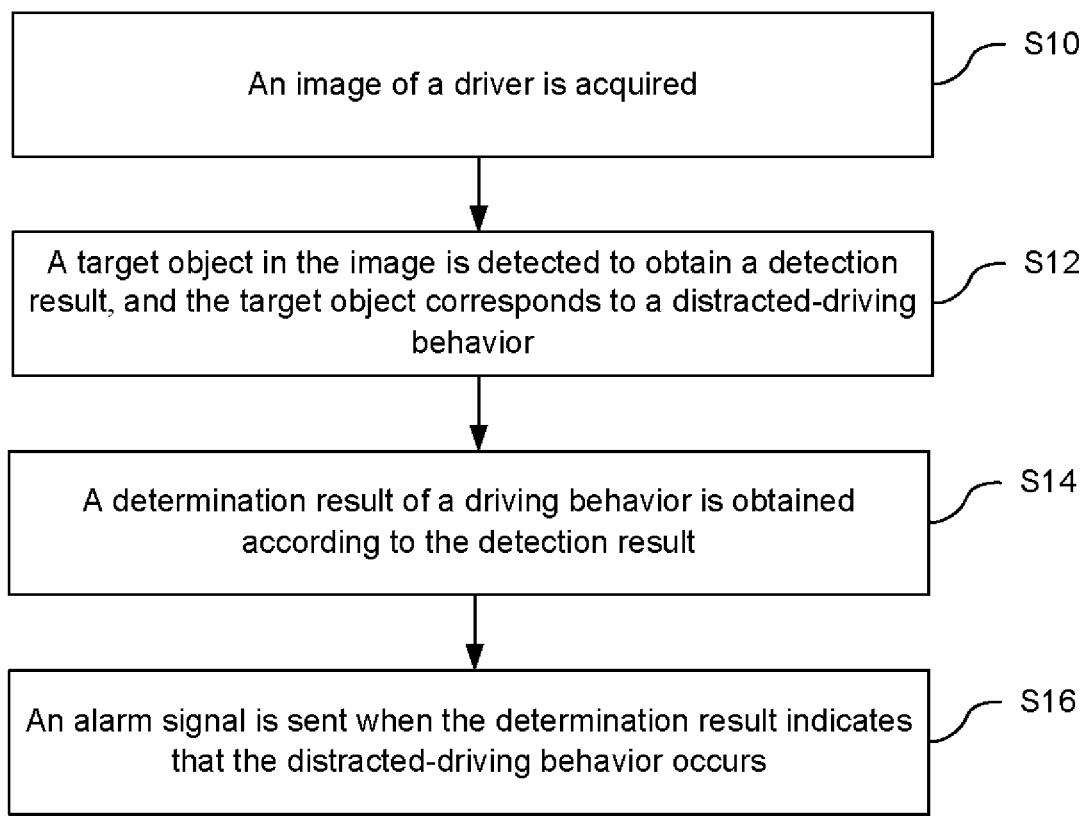
FIG. 1 is a flowchart of a distracted-driving monitoring method according to an embodiment of the present disclosure.

In order to help those skilled in the art to better understand the solution of the present disclosure, the following will clearly and completely describe the technical solution in the embodiments of the present disclosure with reference to the accompanying drawings in the embodiments of the present disclosure. It is apparent that the described embodiments are merely a part of the embodiments of the present disclosure, and not all of the embodiments. Based on the embodiments of the present disclosure, all other embodiments can be obtained by those skilled in the art without creative efforts shall fall within the scope of the present disclosure.

It should be noted that the terms "first", "second" and the like in the specification and claims of the present disclosure are used to distinguish similar objects, and are not necessarily used to describe a particular sequence or order. It is to be understood that the data used in this manner may be interchanged as appropriate, so that the embodiments of the present disclosure described herein can be implemented in a sequence other than other those illustrated or described herein. In addition, the terms "comprise" and "include" and any variations thereof are intended to cover non-exclusive inclusion. For example, a process, method, system, product or device that includes a series of steps or elements is not necessarily limited to those steps or elements that are clearly listed, but may include other steps or elements that are not clearly listed or inherent to such process, method, product or device.

The embodiments of the present disclosure can be applied to computer systems/servers that operate with numerous other general purpose or special purpose computing system environments or configurations. Examples of well-known computing systems, environments, and/or configurations suitable for use with computer systems/servers include, but are not limited to: personal computer systems, server computer systems, handheld or laptop devices, microprocessor based systems, set top boxes, programmable consumer electronics, networked personal computers, small computer systems, large computer systems and distributed cloud computing technology environments including any of the above, and the like.

The computer systems/servers can be described in the general context of computer system executable instructions (such as program components, etc.) executed by the computer system. Generally, program components may include routines, programs, target programs, components, logic and data structures, etc., which perform particular tasks or implement particular abstract data types. The computer systems/servers can be implemented in a distributed cloud computing environment, with tasks being performed by remote processing devices that are linked through a communications network. In a distributed cloud computing environment, the program component may be located on a local or remote computing system storage medium including storage devices.

The following will describe the present disclosure by detailed exemplary embodiments.

FIG. 1 is a flowchart of a distracted-driving monitoring method according to an embodiment of the present disclosure. As shown in FIG. 1, the method may include the following steps S10-S16.

At step S10, an image of a driver is acquired.

At step S12, a target object in the image is detected to obtain a detection result, and the target object corresponds to a distracted-driving behavior.

At step S14, a determination result of a driving behavior is obtained according to the detection result.

At step S16, an alarm signal is sent when the determination result indicates that the distracted-driving behavior occurs.

In this embodiment of the present disclosure, through the above described steps, the image is acquired; the target object in the image is detected to obtain the detection result, and the target object corresponds to the distracted-driving behavior; the determination result of the driving behavior is obtained according to the detection result; and the alarm signal is sent when the determination result indicates that the distracted-driving behavior occurs, so the distracted-driving behavior of the driver can be monitored in real time and alarmed, thus urging the driver to concentrate in driving, to ensure safe driving and avoid traffic accidents.

The following will describe the above steps in detail.

At step S10, the image is acquired.

Optionally, in an embodiment of the present disclosure, the image is acquired by an image acquisition component. The image acquisition component is an independent camera apparatus or a camera apparatus integrated in an electronic device, for example, an independent infrared camera, a depth camera, an RGB camera, a Mono camera, etc., or a camera on a mobile phone, tablet computer, a driving recorder, a navigator, an operation panel, a centre console, and other electronic devices. The image may be acquired by intercepting an image frame in a video obtained by the image acquisition component.

Since light in a car (for example, a cab) usually changes with driving environment, the light in the car (for example, the cab) is relatively brighter in a sunny day, and the light in the car (for example, the cab) is relatively darker at night or in a cloudy day or in a tunnel, while an infrared camera is less affected by light change, and has an ability to work all day, the infrared camera (including a near infrared camera) is selected to acquire the image, so as to acquire a better image quality than an ordinary camera, and improve the accuracy of distracted-driving monitoring results.

Optionally, in an embodiment of the present disclosure, the image acquisition component may be arranged at least one position which may shoot a face of the driver, for example, near an instrument panel, near a center console, near a rear-view mirror, etc. The number of the image acquisition component may be at least one.

Optionally, in an embodiment of the present disclosure, the video frame image may be acquired every predetermined number of frames, to reduce the frequency of acquisition of the video frame image and optimize computing resources.

Optionally, in an embodiment of the present disclosure, the image can be pre-processed, and the pre-processing may include at least one of the following: image scaling, pixel value normalization, and image enhancement; thereby, the image of the driver that meets requirements such as sharpness, size and the like can be obtained.

At step S12, the target object in the image is detected to obtain the detection result, and the target object corresponds to the distracted-driving behavior.

Optionally, in an embodiment of the present disclosure, the target object may be detected by a detection component to obtain the detection result.

Optionally, in an embodiment of the present disclosure, the detection result may indicate whether or not the target object is contained in the image.

Optionally, in an embodiment of the present disclosure, the target object may include at least one of the following: a cigarette, a mobile phone, a drink bottle, a food, and the distracted-driving behavior corresponding to the target object may include at least one of the following: smoking, answering or making a call, drinking, eating.

Optionally, in an embodiment of the present disclosure, the image may be input to a target detection algorithm to detect the target object. And the target detection algorithm is obtained by training a large number of samples offline. In an optional embodiment, the target detection algorithm may be a deep learning algorithm, such as yolo, faster-RCNN, SSD, or the like.

At step S14, the determination result of the driving behavior is obtained according to the detection result.

Optionally, in an embodiment of the present disclosure, a logical determination component may be arranged to obtain the determination result of the driving behavior according to the detection result.

Optionally, in an embodiment of the present disclosure, the determination result of the driving behavior includes one of a normal driving behavior and a distracted-driving behavior. When the detection result indicates that the target object is contained in the image, the determination result of the driving behavior indicates the distracted-driving behavior occurs. When the detection result indicates that the target object is not contained in the image, the determination result of the driving behavior indicates it is the normal driving behavior.

At step S16, the alarm signal is sent when the determination result indicates that the distracted-driving behavior occurs.

Optionally, in an embodiment of the present disclosure, a communication component may be arranged to send the alarm signal according to the determination result. And the alarm signal may be at least one of the following: sound prompt, light prompt, vibration prompt. Specifically, the sound prompt may include voice or ringing, and the light prompt may include lighting or flashing.

Optionally, in an embodiment of the present disclosure, when the determination result indicates the distracted-driving behavior occurs, the image may further be transmitted to a monitor center in real time as the basis for law enforcement or for data collection, data analysis, and further manual confirmation, etc.

Through the above steps, the distracted-driving behavior of the driver may be monitored in real time and alarmed, thus urging the driver to concentrate in driving, to ensure safe driving and avoid traffic accidents. However, the above distracted-driving monitoring method may determine when the driving behavior is a normal driving behavior or a distracted-driving behavior and send a simple alarm signal, but cannot determine the specific type of the distracted-driving behavior and send different alarm prompts.

Figure 2:
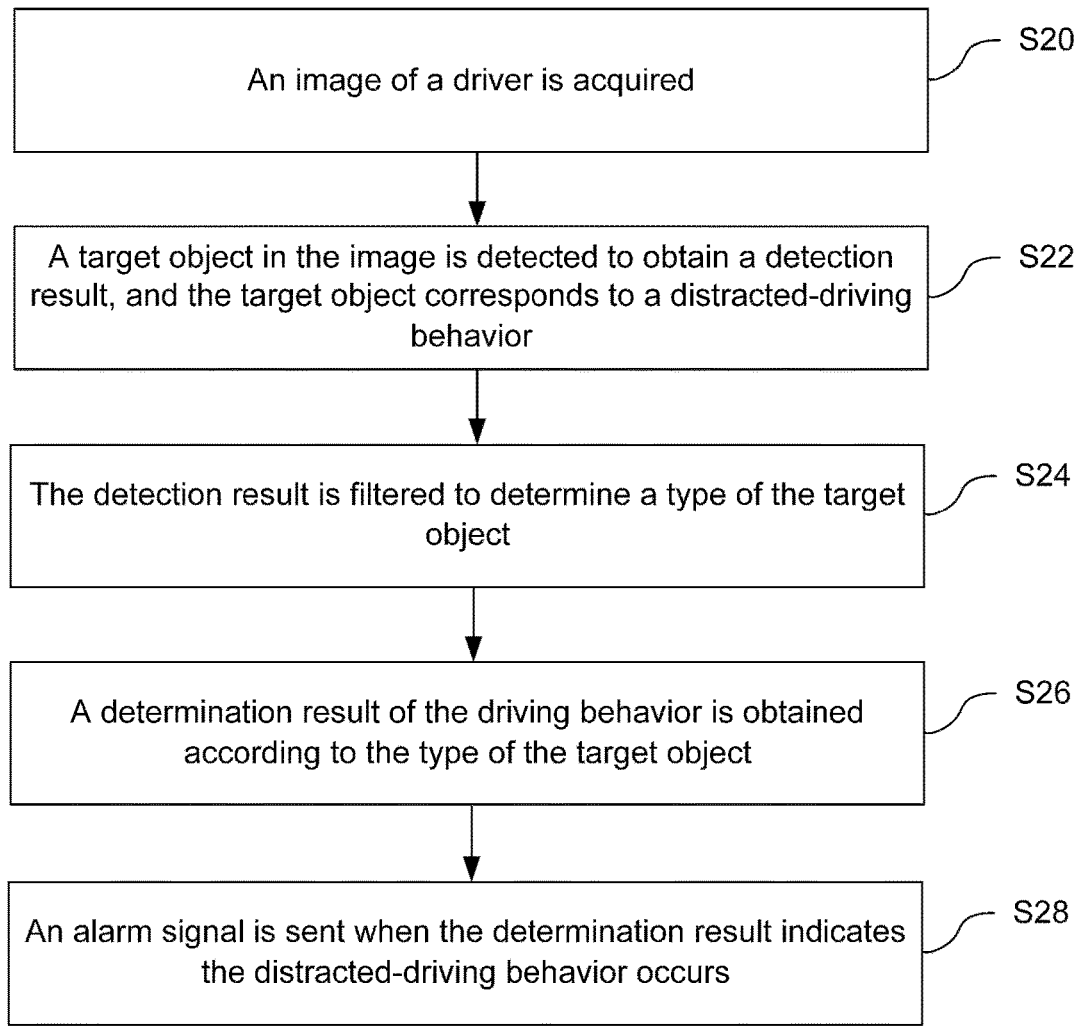
FIG. 2 is a flowchart of a distracted-driving monitoring method according to another embodiment of the present disclosure.
Figure 3:
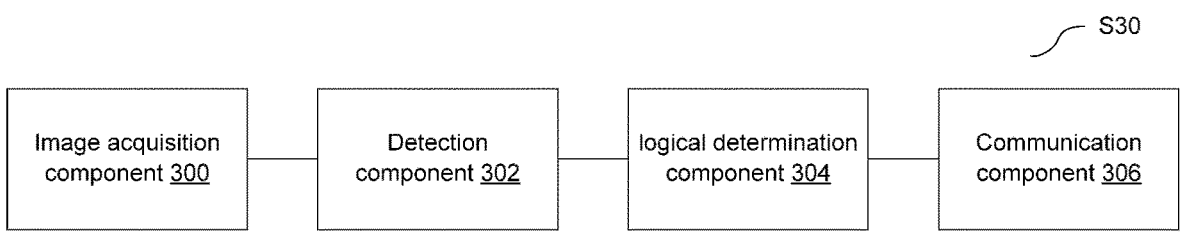
FIG. 3 is a structural block diagram of a distracted-driving monitoring system according to an embodiment of the present disclosure.
Figure 4:
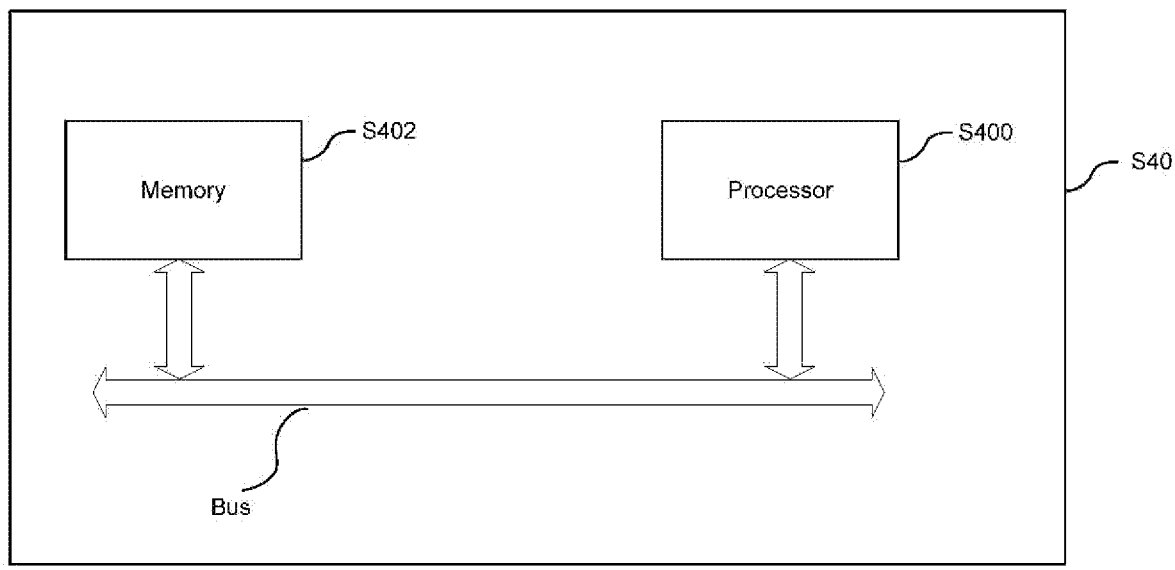
FIG. 4 is a structural block diagram of an electronic device according to an embodiment of the present disclosure.

FIG. 2 is a flowchart of a distracted-driving monitoring method according to another embodiment of the present disclosure. As shown in FIG. 2, the method includes the following steps.

At step S20, an image of a driver is acquired.

At step S22, a target object in the image is detected to obtain a detection result, and the target object corresponds to a distracted-driving behavior.

At step S24, the detection result is filtered to determine a type of the target object.

At step S26, a determination result of the driving behavior is obtained according to the type of the target object.

At step S28, an alarm signal is sent when the determination result indicates the distracted-driving behavior occurs.

In this embodiment of the present disclosure, through the above described steps, the image is acquired; the target object in the image is detected to obtain the detection result, and the target object corresponds to the distracted-driving behavior; the detection result is filtered to determine a type of the target object; the determination result of the driving behavior is obtained according to the type of the target object; and the alarm signal is sent when the determination result indicates the distracted-driving behavior occurs, so in addition to determining whether the behavior of the driver is a normal driving behavior or a distracted-driving behavior and sending a simple alarm signal, it can also determine the specific type of the distracted-driving behavior and send different alarm prompts, thus urging the driver to concentrate in driving, to ensure safe driving and avoid traffic accidents; and at the same time, it can be used as a basis for law enforcement or for data collection, data analysis, and further manual confirmation.

The above step S20 is almost the same as the step S10 shown in FIG. 1, and will not be described herein. The following will illustrate the above step S22 to step S28 separately in detail.

At step S22, the target object in the image is detected to obtain the detection result, and the target object corresponds to a distracted-driving behavior;

Optionally, in an embodiment of the present disclosure, the target object may be detected by a detection component to obtain the detection result.

Optionally, in an embodiment of the present disclosure, the detection result may indicate whether or not the target object is contained in the image.

Optionally, in an embodiment of the present disclosure, the target object may include at least one of the following: a cigarette, a mobile phone, a drink bottle, a food, and the distracted-driving behavior corresponding to the target object may include at least one of the following: smoking, answering or making a call, drinking, eating.

As the distracted-driving behavior includes smoking, answering or making a call, drinking, eating, etc., in order to determine the specific type of the distracted-driving behavior more clearly, optionally, in an embodiment of the present disclosure, in addition to indicate whether or not the target object is contained in the image, when the target object is contained in the image, the detection result in the step S22 may also include: a type of the target object and a probability value corresponding to the type of the target object. The probability value represents the probability of the type of the target object, In an optional embodiment, the value range is 0~1.

At step S24, the detection result is filtered to determine the type of the target object.

Optionally, in an embodiment of the present disclosure, a logical determination component may be arranged to filter the detection result to determine the type of the target object.

Since several detection objects or interferences other than the target objects may be detected on each frame of the image, and some of the detection objects or interferences are wrong detection target objects. In order to remove these wrong detection objects, optionally, in an embodiment of the present disclosure, an operation that filtering the detection result to determine the type of the target object includes the following steps. The probability value corresponding to the type of the target object is compared with a first threshold value to obtain a comparison result. The detection result is filtered according to the comparison result. Different types of the target objects may share the same first threshold value or each type of the target object corresponds to a first threshold value. When the comparison result indicates the probability value corresponding to the type of the target object is larger than the first threshold value, the detection result is retained. When the comparison result indicates the probability value corresponding to the type of the target object is not larger than the first threshold value, the detection result is discarded. When there is one detection result with a probability value that is larger than the first threshold value, the type of the target object is determined. When there are multiple probability values of the detection results are greater than the first threshold value, a detection result with the highest probability value is retained to determine the type of the target object.

Optionally, in an embodiment of the present disclosure, the image may be input to a target detection algorithm to detect the target object. The target detection algorithm may be obtained by training a large number of samples offline. In an optional embodiment, the target detection algorithm may be a deep learning algorithm, such as yolo, faster-RCNN, SSD, or the like.

At step S26, the determination result of the driving behavior is obtained according to the type of the target object;

Optionally, in an embodiment of the present disclosure, a logical determination component may be arranged to obtain the determination result of the driving behavior according to the type of the target object.

Optionally, in an embodiment of the present disclosure, the determination result of the driving behavior includes one of a normal driving behavior and various specific distracted-driving behaviors. When the detection result indicates that the target object is not contained in the image, the determination result of the driving behavior indicates it is the normal driving behavior. When the detection result indicates that the target object is contained in the image, the determination result of the driving behavior indicates the distracted-driving behavior occurs, and according to the type of the target object, the specific distracted-driving behavior may be further determined, for example, smoking, answering or making a call, drinking, eating, etc. Specifically, for example, when the type of the target object is a cigarette, the specific distracted-driving behavior is determined to be smoking; and when the type of the target object is a drink bottle, the specific distracted-driving behavior is determined to be drinking.

At step S28, the alarm signal is sent when the determination result indicates the distracted-driving behavior occurs.

Optionally, in an embodiment of the present disclosure, a communication component may be arranged to send the alarm signal according to the determination result. The alarm signal may be at least one of the following: sound prompt, light prompt, vibration prompt. Specifically, the sound prompt may include voice or ringing, and the light prompt may include lighting or flashing. In an optional embodiment, voice broadcast may be used for providing different prompts for various specific distracted-driving behaviors.

Optionally, in an embodiment of the present disclosure, when the determination result indicates the distracted-driving behavior occurs, the image may further be transmitted to the monitor center in real time as the basis for law enforcement or for data collection, data analysis, and further manual confirmation, etc.

Through the above steps, not only whether the driver's behavior is a normal driving behavior or a distracted-driving behavior may be determined and a simple alarm signal may be sent, but also the type of the specific distracted-driving behavior may be determined and different alarm prompts are given, thus urging the driver to concentrate in driving, to ensure safe driving and avoid traffic accidents; and at the same time, it can be used as a basis for law enforcement or for data collection, data analysis, and further manual confirmation.

Optionally, in an embodiment of the present disclosure, the distracted-driving monitoring method also includes to initialize the hardware and software before acquiring the image in step S10 or step S20.

In order to improve the accuracy of the distracted-driving monitoring result, optionally, in an embodiment of the present disclosure, after the step S10 or step S20 (i.e., acquiring the image), the method further includes step S11: detecting a face area. It should be noted that step S11 may be performed before, after or at the same time as step S12 or step S22 (i.e., detecting the target object in the image to obtain the detection result).

Due to the large overall area of the image, there may be several target objects or interferences other than targets in the area. In order to improve the accuracy of the distracted-driving monitoring result, optionally, in an embodiment of the present disclosure, the detection result in step S12 or step S22 may also include the position of the target object. The position of the target object may be represented by a rectangular frame, including the coordinates of the upper left corner and the lower right corner, or the coordinates of the upper right corner and the lower left corner, or the coordinates of the upper left corner, the lower right corner, the upper right corner and the lower left corner.

When the detection result in step S12 or step S22 includes the position of the target object, step S14 or step S24 may further include step S13.

At step S13, a rationality of the detection result is evaluated. Optionally, in an embodiment of the present disclosure, the rationality of the detection result may be evaluated by analysing the relative positional relationship between the position of the target object and a predetermined reasonable area. Specifically, an operation of evaluating the rationality of the detection result includes the following steps. A cross ratio of the positon of the target object and the corresponding predetermined reasonable area of the target object is calculated, and the cross ratio is compared with a second threshold value. When the cross ratio is larger than the second threshold value, it is determined that the position of the target object is in the predetermined reasonable area, the target detection result is credible, and the next step may be carried out. When the cross ratio is not larger than the second threshold value, the target detection result is discarded. The predetermined reasonable area may be preset according to the possible reasonable area of the distracted-driving behavior in the face area. For example, the predetermined reasonable area corresponding to the behavior of answering or making a call may be the two sides or the lower area of the face area, and the predetermined reasonable area corresponding to the behavior of smoking may be the lower area of the face area.

By adding at least one of step S11 of detecting the face area and step S13 of evaluating the rationality of the detection result, the accuracy of the distracted-driving monitoring result can be improved.

In order to further improve the accuracy of the distracted-driving monitoring result, optionally, in an embodiment of the present disclosure, step S14 or step S16 may also determine a final determination result by combining the determination results of the continuous frames, so as to determine the distracted-driving behavior more accurately and reduce the false detection rate. Specifically, an operation of combining the determination results of the continuous frames includes the following steps. A queue structure is used for storing the determination result of each frame in the last t seconds, the queue structure is maintained to obtain a queue record, and the queue record is traversed. When a proportion of a driving behavior in the last t seconds exceeds a third threshold value, the driving behavior is taken as the final determination result.

In another embodiment of the present disclosure, a distracted-driving monitoring system is provided, and the distracted-driving monitoring system 30 includes:

an image acquisition component 300, configured to acquire an image of a driver;

Optionally, in an embodiment of the present disclosure, the image acquisition component 300 is an independent camera apparatus or a camera apparatus integrated in an electronic device, for example, an independent infrared camera, a depth camera, an RGB camera, a Mono camera, etc., or a camera on a mobile phone, tablet computer, a driving recorder, a navigator, an operation panel, a centre console, and other electronic devices. The image may be acquired by intercepting the image frame in the video obtained by the image acquisition component.

Since light in a car (for example, a cab) usually changes with driving environment, the light in the car (for example, the cab) is relatively brighter in a sunny day, and the light in the car (for example, the cab) is relatively darker at night or in a cloudy day or in a tunnel, while an infrared camera is less affected by light change, and has an ability to work all day, the infrared camera (including a near infrared camera) is selected to acquire the image, so as to acquire a better image quality than an ordinary camera, and improve the accuracy of distracted-driving monitoring results.

Optionally, in an embodiment of the present disclosure, the image acquisition component 300 may be arranged at least one position which may shoot a face of the driver, for example, near an instrument panel, near a center console, near a rear-view mirror, etc. The number of the image acquisition component may be at least one.

Optionally, in an embodiment of the present disclosure, the video frame image may be acquired every predetermined number of frames, to reduce the frequency of acquisition of the video frame image and optimize computing resources.

Optionally, in an embodiment of the present disclosure, the image acquisition component 300 may pre-process the image, and the pre-processing may include at least one of the following: image scaling, pixel value normalization, and image enhancement; thereby, the image of the driver that meets requirements such as sharpness, size and the like can be obtained.

A detection component 302, configured to detect a target object in the image to obtain a detection result;

Optionally, in an embodiment of the present disclosure, the detection result may indicate whether or not the target object is contained in the image.

Optionally, in an embodiment of the present disclosure, the target object may include at least one of the following: a cigarette, a mobile phone, a drink bottle, a food, and the distracted-driving behavior corresponding to the target object may include at least one of the following: smoking, answering or making a call, drinking, eating.

Optionally, in an embodiment of the present disclosure, the detection component 302 is further configured to detect the target object by using a target detection algorithm. And the target detection algorithm may be obtained by training a large number of samples offline. In an optional embodiment, the target detection algorithm may be a deep learning algorithm, such as yolo, faster-RCNN, SSD, or the like.

A logical determination component 304, configured to obtain a determination result of a driving behavior according to the detection result.

Optionally, in an embodiment of the present disclosure, the determination result of the driving behavior includes one of a normal driving behavior and a distracted-driving behavior. When the detection result indicates that the target object is contained in the image, the determination result of the driving behavior indicates the distracted-driving behavior occurs. When the detection result indicates that the target object is not contained in the image, the determination result of the driving behavior indicates it is the normal driving behavior.

A communication component 306, configured to send an alarm signal when the determination result indicates a distracted-driving behavior occurs.

Optionally, in an embodiment of the present disclosure, the alarm signal may be at least one of the following: sound prompt, light prompt, vibration prompt. Specifically, the sound prompt may include voice or ringing, and the light prompt may include lighting or flashing.

Optionally, in an embodiment of the present disclosure, when the determination result indicates the distracted-driving behavior occurs, the communication component 306 may further transmit the image to a monitor center in real time as the basis for law enforcement or for data collection, data analysis, and further manual confirmation, etc.

The above described image acquisition component 300, detection component 302, logical determination component 304 and communication component 306 may be configured in the distracted-driving monitoring system in a mutually independent way, or partially or completely integrated as a large block in the distracted-driving monitoring system. Therefore, the distracted-driving monitoring system can monitor the distracted-driving behavior of the driver in real time and send an alarm signal, thus urging the driver to concentrate in driving, to ensure safe driving and avoid traffic accidents.

As the distracted-driving behavior includes smoking, answering or making a call, drinking, eating, etc., in order to determine the specific type of the distracted-driving behavior more clearly, optionally, in another distracted-driving monitoring system according to an embodiment of the present disclosure, in addition to detect whether or not the target object is contained in the image, the detection component 302 may also detect a type of the target object and a probability value corresponding to the type of the target object. The probability value represents the probability of the type of the target object, In an optional embodiment, the value range is 0~1.

The logical determination component 304 may be configured to filter the detection result to according to the probability value to determine the type of the target object. Since several detection objects or interferences other than the target objects may be detected on each frame of the image, and some of detection objects or interferences are wrong detection target objects. In order to remove these wrong detection targets, optionally, in an embodiment of the present disclosure, the logical determination component 304 is configured to compare the probability value corresponding to the type of the target object with a first threshold value to obtain a comparison result, and filter the detection result according to the comparison result. Different types of the target objects may share the same first threshold value or each type of the target object corresponds to the first threshold value. When the comparison result indicates the probability value corresponding to the type of the target object is larger than the first threshold value, the detection result is retained. When the comparison result indicates the probability value corresponding to the type of the target object is not larger than the first threshold value, the detection result is discarded. When there is one detection result with a probability value that is larger than the first threshold value, the type of the target object may be determined. When there are multiple probability values of the detection results are greater than the first threshold value, a detection result with the highest probability value is retained to determine the type of the target object. Optionally, in an embodiment of the present disclosure, the determination result of the driving behavior includes one of a normal driving behavior and various specific distracted-driving behaviors. When the detection result indicates that the target object is not contained in the image, the determination result of the driving behavior indicates it is the normal driving behavior. When the detection result indicates that the target object is contained in the image, the determination result of the driving behavior indicates the distracted-driving behavior occurs, and according to the type of the target object, the specific distracted-driving behavior may be further determined, for example, smoking, answering or making a call, drinking, eating, etc. Specifically, for example, when the type of the target object is a cigarette, the specific distracted-driving behavior is determined to be smoking; and when the type of the target object is a drink bottle, the specific distracted-driving behavior is determined to be drinking.

Then the communication component 306 may be arranged to send the alarm signal according to the determination result. The alarm signal may be at least one of the following: sound prompt, light prompt, vibration prompt. Specifically, the sound prompt may include voice or ringing, and the light prompt may include lighting or flashing. In an optional embodiment, voice broadcast may be used for providing different prompts for various specific distracted-driving behaviors.

In another distracted-driving monitoring system according to an embodiment of the present disclosure, the detection component 302 may also be configured to detect the face area and the position of the target object after the image is acquired. The position of the target object may be represented by a rectangular frame, including coordinates of a upper left corner and a lower right corner, or coordinates of a upper right corner and a lower left corner, or coordinates of the upper left corner, the lower right corner, the upper right corner and the lower left corner.

The logical determination component 304 may also be configured to evaluate the rationality of the detection result. Optionally, in an embodiment of the present disclosure, the rationality of the detection result may be evaluated by analysing the relative positional relationship between the position of the target object and a predetermined reasonable area. Specifically, an operation of evaluating the rationality of the detection result the following steps. A cross ratio of the positon of the target object and the corresponding predetermined reasonable area of the target object is calculated, and the cross ratio is compared with a second threshold value. When the cross ratio is larger than the second threshold value, it is determined that the position of the target object is in the predetermined reasonable area, the target detection result is credible, and the next step may be carried out. When the cross ratio is not larger than the second threshold value, the target detection result is discarded. The predetermined reasonable area may be preset according to the possible reasonable area of the distracted-driving behavior in the face area. For example, the predetermined reasonable area corresponding to the behavior of answering or making a call may be the two sides or the lower area of the face area, and the predetermined reasonable area corresponding to the behavior of smoking may be the lower area of the face area.

In yet another distracted-driving monitoring system according to an embodiment of the present disclosure, the logical determination component 304 may also be configured to determine a final determination result by combining the determination results of the continuous frames, so as to determine the distracted-driving behavior more accurately and reduce the false detection rate. Specifically, an operation of combining the determination results of the continuous frames includes the following steps. A queue structure is used for storing the determination result of each frame in the last t seconds, the queue structure is maintained to obtain a queue record, and the queue record is traversed. When a proportion of a driving behavior in the last t seconds exceeds a third threshold value, the driving behavior is taken as the final determination result.

In another embodiment of the present disclosure, an electronic device is provided, the electronic device 40 includes: a processor 400 and a memory 402 for storing executable instructions of the processor 400. The processor 400 is configured to perform any of above-mentioned distracted-driving monitoring methods by executing the executable instructions.

In another embodiment of the present disclosure, a storage medium for storing programs is provided. A device in which the storage medium is stored is controlled to execute any of above-mentioned distracted-driving monitoring methods when the programs are running.

It can be fully understood by those skilled in the art that the application scenario of the embodiment of the present disclosure is not limited to vehicle driving, but also can be widely used for monitoring the driving state of drivers in the driving process of ships, airplanes, trains, subways, light rail and other various means of transportation.

The sequence number of the embodiment of the present disclosure is for description and does not represent the advantages and disadvantages of the embodiment.

In the above-mentioned embodiments of the present disclosure, the description of the various embodiments has different emphasis, and the parts that are not detailed in certain embodiment can be referred to the related description of other embodiments.

In the embodiments provided by the present disclosure, it should be understood that the disclosed technical contents may be implemented in other manner. The embodiment of the above described device is only an example, for example, the elements may be divided according to logical functions. In actual implementations, there may be another division manner, for example, multiple elements or components may be combined or integrated into another system, or some features can be ignored or not be executed. In addition, the mutual coupling or direct coupling or communication as shown or discussed can be an indirect coupling or communication through some interfaces, elements or components, and may be electrical or in other forms.

The elements described as separate components may be or may not be physical separated, the components shown as elements may be or may not be physical elements, that is, may be located in one place, or may be distributed to multiple elements. Some or all of the elements may be selected according to actual requirements to achieve the purpose of the solution according to the embodiment of the present disclosure.

In addition, the various function elements in the embodiments of the present disclosure may be integrated into one processing element, or each element may exist physically separately, or two or more elements may be integrated into one element. The above integrated element may be implemented in the form of hardware or in the form of a software functional element.

The integrated element, when implemented in the form of a software functional element and sold or used as an independent product, can be stored in a computer readable storage medium. Based on such understanding, the essential part or the part that contributes relative to the prior art, or the all or part of the technical solution of the present disclosure may be embodied in the form of a software product. The computer software product may be stored in a storage medium, and the storage medium includes a number of instructions to enable a computer device (may be a personal computer, a server or a network device, etc.) to execute all or part of the steps of the methods described in embodiments of the present disclosure. The storage medium includes: a U disk, a Read-Only Memory (ROM), a Random Access Memory (RAM), a removable hard disk, a magnetic disk or an optical disk, and other mediums for storing the program codes.

The above described are some exemplary embodiments of the present disclosure, and it should be noted that those skilled in the art may also make several improvements and amendments without departing from the principles of the present disclosure, and those improvements and amendments should be considered within the protection scope of the present disclosure.

What is claimed is:

1. A distracted-driving monitoring method, comprising:
    acquiring an image of a driver;
    detecting a target object in the image to obtain a detection result, wherein the target object corresponds to a distracted-driving behavior;
    obtaining a determination result of a driving behavior according to the detection result; and
    sending an alarm signal when the determination result indicates that the distracted-driving behavior occurs;
    wherein the detection result comprises a type of the target object and a probability value corresponding to the type of the target object, comparing the probability value corresponding to the type of the target object with a first threshold value to obtain a comparison result; and filtering the detection result according to the comparison result;
    when the comparison result indicates the probability value corresponding to the type of the target object is larger than the first threshold value, retaining the detection result;
    when the comparison result indicates the probability value corresponding to the type of the target object is not larger than the first threshold value, discarding the detection result;
    wherein when there are a plurality of probability values of the detection results greater than the first threshold value, a detection result with the highest probability value is retained.

2. The method as claimed in claim 1, wherein the image is acquired by an image acquisition component, and the image acquisition component is an independent camera apparatus or a camera apparatus integrated in an electronic device.

3. The method as claimed in claim 1, wherein the target object comprises at least one of the following: a cigarette, a mobile phone, a drink bottle, a food, and the distracted-driving behavior corresponding to the target object comprises at least one of the following: smoking, answering or making a call, drinking, eating.

4. The method as claimed in claim 1, wherein the detection result indicates whether or not the target object is contained in the image, and when the detection result indicates that the target object is contained in the image, the determination result of the driving behavior indicates the distracted-driving behavior occurs.

5. The method as claimed in claim 1, wherein the method further comprises:
    filtering the detection result according to the probability value.

6. The method as claimed in claim 1, wherein the method further comprises: detecting a face area after the image is acquired.

7. The method as claimed in claim 1, wherein the detection result comprises a position of the target object.

8. The method as claimed in claim 7, wherein the method further comprises:
    evaluating a rationality of the detection result by analyzing a relative positional relationship between the position of the target object and a predetermined reasonable area.

9. The method as claimed in claim 8, wherein evaluating the rationality of the detection result by analyzing the relative positional relationship between the position of the target object and the predetermined reasonable area comprises:
    calculating an intersection over union of the position of the target object and the predetermined reasonable area corresponding to the target object, and comparing the intersection over union with a second threshold value;
    when the intersection over union is larger than the second threshold value, determining that the position of the target object is in the predetermined reasonable area, and the target detection result is credible;
    when the intersection over union is not larger than the second threshold value, discarding the target detection result.

10. The method as claimed in claim 1, wherein after the image is acquired, the method further comprises:
    pre-processing the image to obtain a pre-processed image, wherein the pre-processing comprises at least one of the following: image scaling, pixel value normalization, image enhancement.

11. The method as claimed in claim 1, wherein a position, a type and a probability value of the target object in the image or the pre-processed image are determined by using a depth learning algorithm which is an algorithm for detecting targets, and the probability value is a probability of which type the target object belongs to.

12. The method as claimed in claim 1, wherein a final determination result is determined by combining determination results of continuous frames.

13. The method as claimed in claim 12, wherein a queue structure is a kind of data structure, which is a special linear table, which is used for storing the determination result of each frame in the last t seconds, the queue structure is maintained to obtain a queue record, the queue record is traversed, and when a relative duration of a driving behavior during the last t seconds exceeds a third threshold value, this driving behavior is taken as the final determination result.

14. An electronic device, comprising:
    a processor; and
    a memory for storing executable instructions of the processor;

wherein the processor is configured to perform the distracted-driving monitoring method as claimed in claim 1 by executing the executable instructions.

15. A non-transitory storage medium, wherein the non-transitory storage medium comprises a stored program, wherein a device in which the non-transitory storage medium is stored is controlled to execute the distracted-driving monitoring method as claimed in claim 1 when the stored program is running.

* * * * *